(12) United States Patent
Ehrich et al.

(10) Patent No.: US 7,519,704 B2
(45) Date of Patent: *Apr. 14, 2009

(54) FILTERING NON-INVASIVE DATA COLLECTION

(75) Inventors: Nathanael F. Ehrich, Raleigh, NC (US); Robert C. Leah, Cary, NC (US); Niraj P. Joshi, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1401 days.

This patent is subject to a terminal disclaimer.

(21) Appl. No.: 10/425,766

(22) Filed: Apr. 28, 2003

(65) Prior Publication Data

US 2004/0215511 A1 Oct. 28, 2004

(51) Int. Cl.
*G06F 15/173* (2006.01)
(52) U.S. Cl. .................. 709/224; 705/10; 705/14; 705/27
(58) Field of Classification Search .......... 709/224; 705/10, 14, 27
See application file for complete search history.

(56) References Cited

U.S. PATENT DOCUMENTS

| | | | |
|---|---|---|---|
| 5,490,199 A | 2/1996 | Fuller et al. ............... 379/1 |
| 5,796,952 A | 8/1998 | Davis et al. ........... 395/200.54 |
| 5,870,559 A | 2/1999 | Leshem et al. ......... 395/200.54 |
| 6,144,962 A | 11/2000 | Weinberg et al. ........... 707/10 |
| 6,341,310 B1 | 1/2002 | Leshem et al. ............ 709/223 |
| 6,397,256 B1 | 5/2002 | Chan et al. ............... 709/229 |
| 6,434,745 B1 | 8/2002 | Conley, Jr. et al. ......... 717/177 |
| 6,449,604 B1 | 9/2002 | Hansen et al. .............. 707/1 |
| 6,470,269 B1 | 10/2002 | Adar et al. ............... 701/219 |
| 6,470,383 B1 | 10/2002 | Leshem et al. ............ 709/223 |
| 6,477,575 B1 * | 11/2002 | Koeppel et al. ............ 709/224 |
| 6,484,149 B1 * | 11/2002 | Jammes et al. .............. 705/26 |
| 7,028,001 B1 * | 4/2006 | Muthuswamy et al. ...... 705/14 |
| 2002/0111865 A1 * | 8/2002 | Middleton et al. ........... 705/14 |
| 2004/0078292 A1 * | 4/2004 | Blumenau ................. 705/27 |

FOREIGN PATENT DOCUMENTS

GB  2357679 A  *  6/2001

OTHER PUBLICATIONS

"Method for Defining and Combining Partial Web Pages," IBM Research Disclosure, Jul. 2001, p. 1264-69, document No. 447173.

* cited by examiner

*Primary Examiner*—Phuoc Nguyen
*Assistant Examiner*—Asghar Bilgrami
(74) *Attorney, Agent, or Firm*—VanLeeuwen & VanLeeuwen (57) ABSTRACT

Filtering non-invasive data collection is presented. A server segments a web page into regions and sends the segmented web page along with a data collector program to a client. The client loads the web page whereupon the data collector program detects a user event corresponding to one of the regions. The data collector program uses one or more collection threshold settings to filter user event data corresponding to the user event. The server receives collected user event data and sends an acknowledgement message to the client whereby indicating that the server received the user event data intact. The server may also adjust one or more collection threshold settings and include the adjusted collection threshold settings in the acknowledgement message.

4 Claims, 11 Drawing Sheets

```
<BODY>

<TABLE class="container" CELLPADDING="0" CELLSPACING="0" BORDER="0" WIDTH="100%"
HEIGHT="100%" ALIGN="left">
<TR>
  <TD ALIGN="left" VALIGN="top" ID="region1" onmouseover="handleEnterRegion(event);"
onmouseout="handleExitRegion(event);">
    region 1
  </TD>
  <TD ALIGN="left" VALIGN="top" ID="region2" onmouseover="handleEnterRegion(event);"
onmouseout="handleExitRegion(event);">
    region 2
  </TD>
</TR>
<TR>
  <TD ALIGN="left" VALIGN="top" ID="region3" onmouseover="handleEnterRegion(event);"
onmouseout="handleExitRegion(event);">
    region 3
  </TD>
  <TD ALIGN="left" VALIGN="top" ID="region4" onmouseover="handleEnterRegion(event);"
onmouseout="handleExitRegion(event);">
    region 4
  </TD>
</TR>
</TABLE>

</BODY>
```

*Figure 4*

```
<HEAD>
    body
   function handleEnterRegion( event )                    510
   {
     var region = ( event.srcElement ? event.srcElement : event.target );

if ( !region.isCollected )          515
      {
         var mouseX = ( event.clientX ? event.clientX : event.pageX );     520
         var mouseY = ( event.clientY ? event.clientY : event.pageY );     521 region.timeOfEntry = (new Date()).valueOf();      530
      }
   }                                            540
   function handleExitRegion( event )
   {
     var region = ( event.srcElement ? event.srcElement : event.target );

if ( !region.isCollected )
     {
         var mouseX = ( event.clientX ? event.clientX : event.pageX );     550
         var mouseY = ( event.clientY ? event.clientY : event.pageY );     551
         region.timeOfExit = (new Date()).valueOf();             555
         var timeActive = region.timeOfExit - region.timeOfEntry;
                                                                  560 window.status = region.id + " active for " + ( timeActive/1000 ) + " seconds.";
         region.isCollected = true;                                        570
      }                        580
     else
      {                                                                590
         window.status = "Non-invasive data collection complete.";
      }
   }
   function report()
   {
   }
  </script>
</HEAD>
```

FILTERING NON-INVASIVE DATA COLLECTION

BACKGROUND OF THE INVENTION

1. Technical Field

The present invention relates in general to a system and method for filtering non-invasively collected data. More particularly, the present invention relates to selectively collecting user event data corresponding to a web page region based upon particular collection threshold settings, and sending the collected user event data to a server to process.

2. Description of the Related Art

The Internet has changed the way that a business presents itself in order to attract and maintain customers. In many cases, a customer may come in contact with a particular business solely through the business' website. In these situations, the website is the business' most important asset in influencing a customer to place an order. For example, a customer may not know of a particular business because the business does not have retail stores near the customer's location. In this example, a customer determines whether to place an order with the business based upon the customer's website experience. In other words, a business' home page and the organization of a business' website may determine whether a customer places an order.

A business attempts to organize its website whereby items of most customer interest are positioned such that a user is not required to click down multiple layers in order to view the item. For example, a customer may be interested in a popular children's toy and if the customer does not see the toy, or a link to the toy, on the business' home page, the customer may not wish to "click" through the business' website in order to find the toy, but rather access another business' homepage that displays the toy.

A challenge found in identifying how users view a business' website, however, is that a business is not able to collect data that identifies which portions (i.e. regions) of a particular web page that a user views. For example, a website may include a Java applet that is loaded to perform a particular function, such as a mortgage calculator, and a user selects a command button in order to access the mortgage calculator. In this example, since the mortgage calculator is a Java applet, the business is not notified when a user selects the mortgage calculator and thus, the business does not know how many users access the mortgage calculator. Therefore, the business does not know the importance of the mortgage calculator to its customers.

In another example, a business may have a long home page that requires a user to scroll down the page in order to view items at the bottom of the home page. In this example, the business identifies that items at the bottom of the home page do not sell as well as items at the top of the home page. The business, however, is not able to determine whether the lesser selling items are being viewed as frequently as the items at the top of the page or whether the lesser selling items are just not as popular as the items at the top of the page.

Furthermore, a challenge found is managing the quantity of user event data that a server receives in order to minimize data repetitiveness for a particular region. For example, a business may receive an over abundance of user event data corresponding to a particular region during a user session in which each user event data includes the same information (i.e. mouse entry in region X). In this example, the business may wish to limit the amount of user event data that is collected for a particular region in order to minimize the repetitiveness of the user event data.

What is needed, therefore, is a system and method to filter user event data that is sent to a server for processing. Furthermore, what is needed is a system and method to filter data based upon predetermined thresholds and based upon which region in the web page is being acted upon by the user.

SUMMARY

It has been discovered that the aforementioned challenges are resolved by using collection threshold settings to filter user event data which is collected for a particular web page region. A client receives a web page from a server whereby the server divided the web page into regions. When a user performs a user event within a particular web page region, such as moving his mouse, a collector program compares user event history with one or more collection threshold settings in order to determine whether to collect user event data corresponding to the user event.

A server segments a web page by dividing the web page into regions. When the server receives a client request, the server sends the segmented web page along with a data collector program that is designed to monitor user event activity for each web page region. The data collector program includes collection threshold settings which are used to filter the user event data.

The client receives the web page and the data collector program, and displays the web page on the client's display for the user to view. The client also loads the data collector program which initiates particular event handlers. The event handlers monitor and track user events at the client based upon criteria that is included in the data collector program. When the user performs a user event, such as moving his pointing device into a web page region, the data collector program compares user event history with one or more collection threshold settings to determine whether to collect user event data. When the data collector program decides to collect user event data, the data collector program collects the data and associates the data with a corresponding web page region. The data collector program formats the user event data, and sends the user event data to the server to process.

The server determines whether it received the user event data intact (i.e. error free). If the server receives the user event data intact, the server sends an acknowledgement message to the client which indicates to the client that the server received the user event data. In one embodiment, the client re-sends the user event data to the server if the client does not receive an acknowledgement message within a particular time period.

In another embodiment, the server compares user event data history and determines whether to adjust collection threshold settings for user event data collection. For example, the server may be receiving a numerous amount of user event data corresponding to the user's pointing device entering a particular region. In this example, the server may adjust collection threshold settings in order to decrease the amount of user event data that the server receives corresponding to the particular region.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
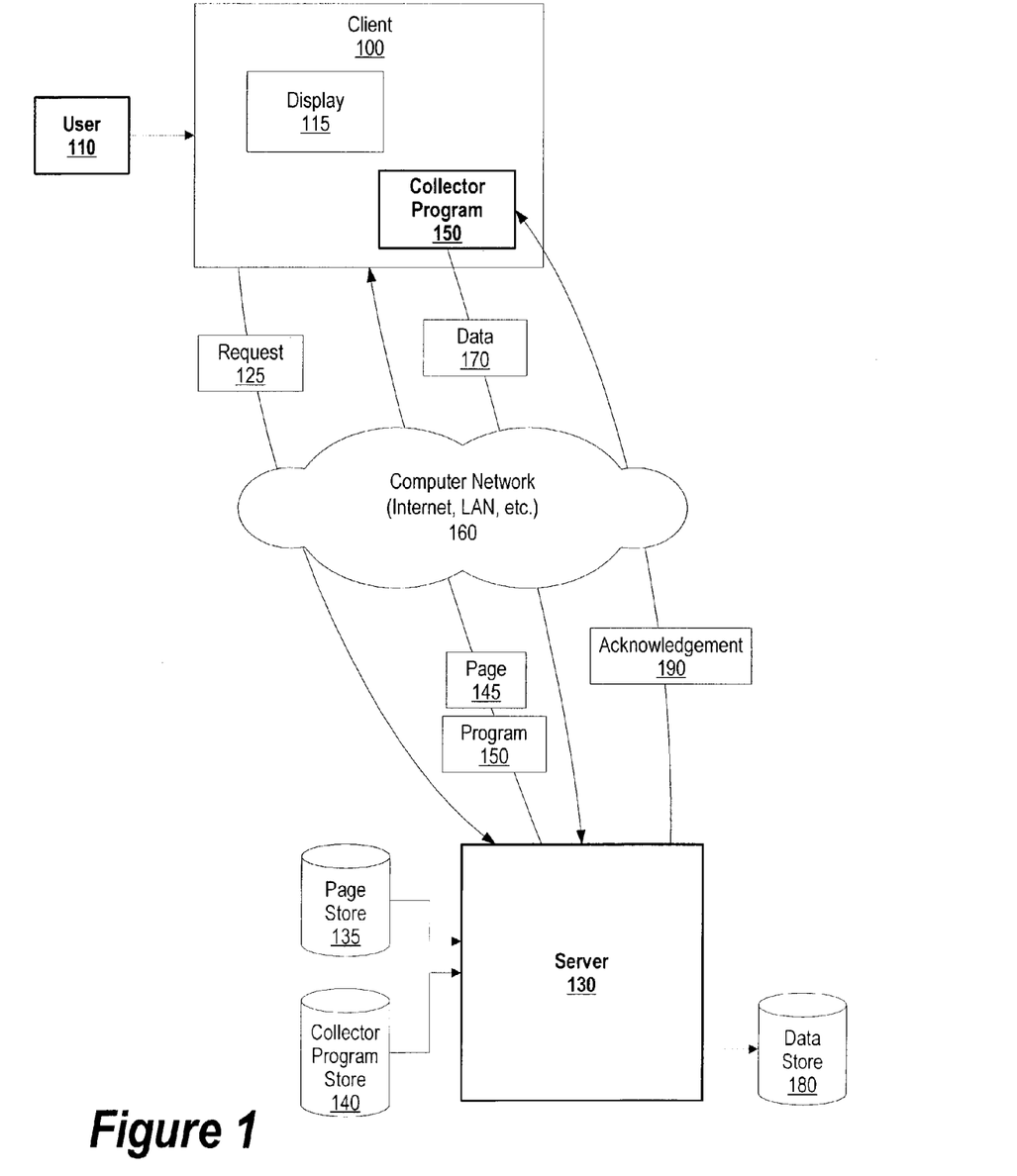
FIG. 1 is a diagram showing a client sending user event data to a server that corresponds to a page of data.

FIG. 1 is a diagram showing a client sending user event data to a server that corresponds to a page of data. User 110 uses client 100 to request a page of data from server 130, such as a web page. Client 100 includes display 115 which displays the particular web page. When user 110 wishes to view a web page, client 100 sends request 125 to server 130 through computer network 160, such as the Internet. For example, user 110 may wish to view his Yahoo home page.

Figure 2:
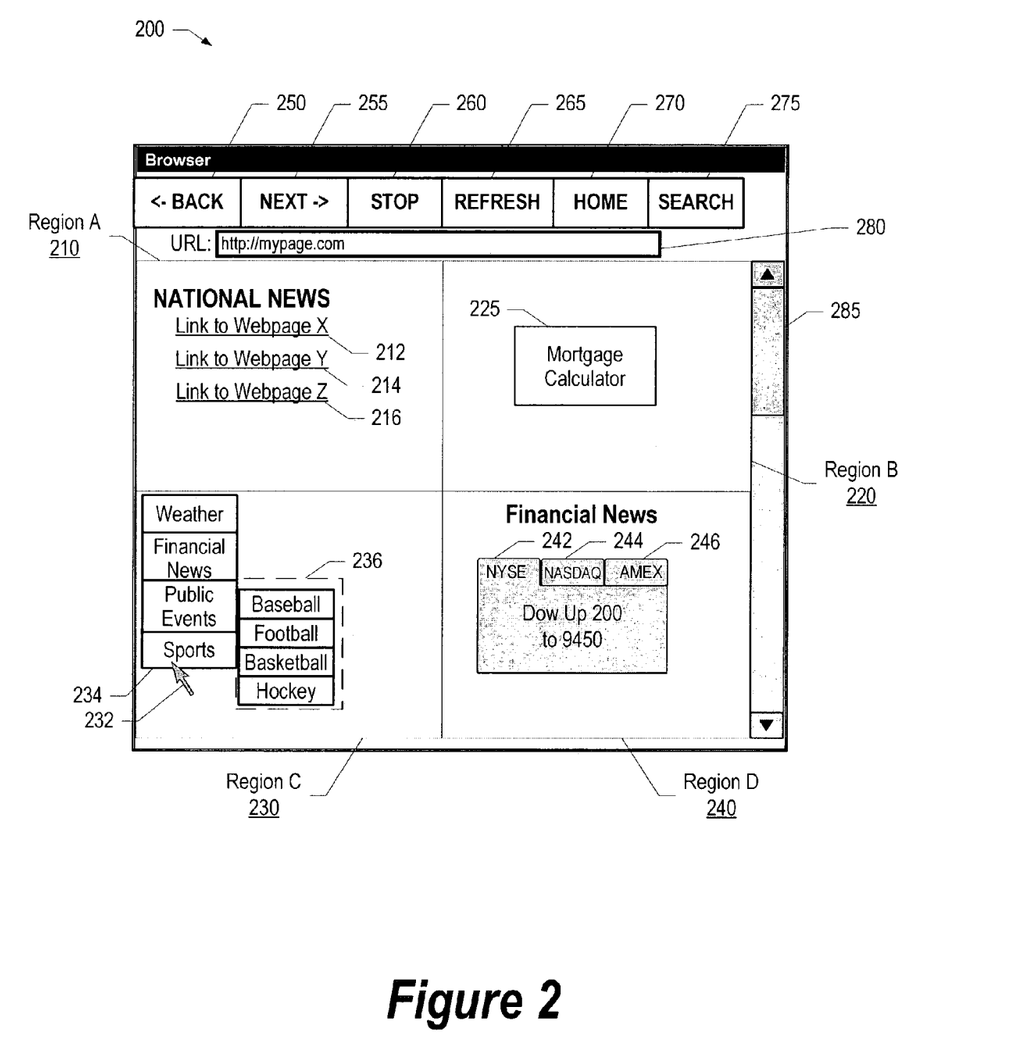
FIG. 2 is a user interface window showing regions that include various user functions.
Figure 3:
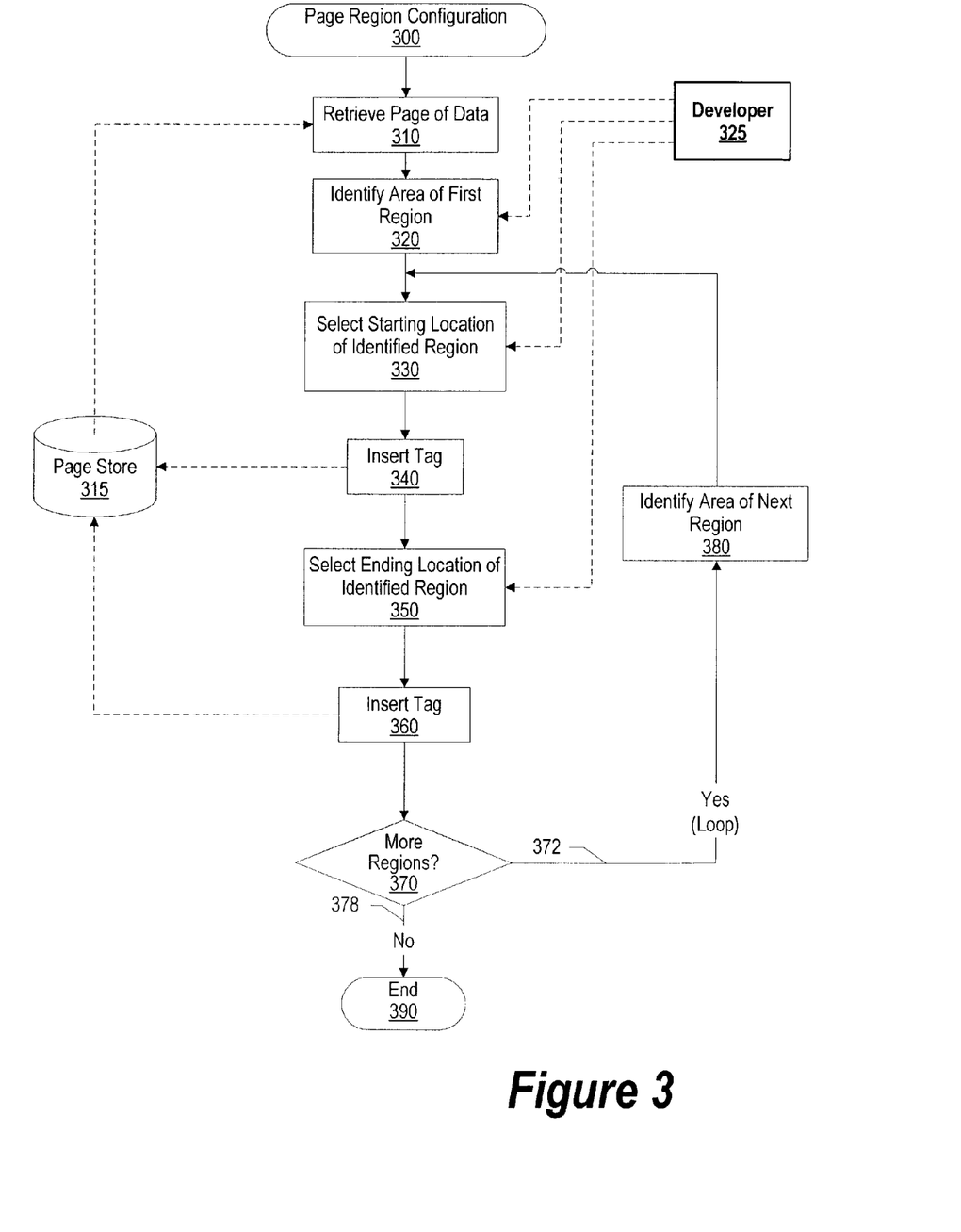
FIG. 3 is a flowchart showing steps taken in a developer dividing a web page into regions.

Server 130 receives request 125 and retrieves the requested web page which is divided into regions from page store 135 (see FIGS. 2, 3 and corresponding text for further details regarding regional divisions). Page store 135 may be stored on a non-volatile storage area, such as a computer hard drive. Server 130 also retrieves a data collector program from collector program store 140 which collects user event data at a client corresponding to the requested web page. In one embodiment, the collector program is included in the requested web page. Server 130 sends page 145 and program 150 to client 100 through computer network 160. Client 100 receives page 145 and program 150, and displays page 145 on display 115 for user 110 to view. Client 100 also loads program 150 which initiates particular event handlers. The event handlers monitor and track user events at client 100 based upon criteria that is included in program 150.

When user 110 uses his pointing device to move around the web page, or his keyboard to enter or select information on the web page, collection program 150 identifies the user event and proceeds through a series of steps to determine whether to send corresponding user event data to server 130. Collection program 150 is interested in user events that occur within the web page, such as mouse movements within regions (see FIGS. 6, 7, 8, and corresponding text for further details regarding data collection).

When collection program 150 identifies a valid user event, collection program 150 collects data until the user event is complete. For example, user 110 may have moved his pointing device over a particular region and left his pointing device in the region for thirty seconds. Collection program 150 formats the user event data, and sends user event data 170 to server 130 through computer network 160. Server 130 receives user event data 170 and stores it in data store 180. Data store 180 may be stored on a non-volatile storage area, such as a computer hard drive.

As one skilled in the art can appreciate, user event data may non-invasively sent to a server using a technique such as creating an image object and composing a URL which is set as the source attribute of the image object. Using this technique, user event data is included in the URL's query string which is sent to a server when the client silently requests the URL. The server returns an image which may be of varying size as determined by the server. The size of the image may be used to indicate a response message (i.e. returning a 1 pixel×1 pixel image indicates successful transmission, 2 px×2 px image indicates server overflow, etc.).

Server 130 determines whether it received user event data 170 intact (i.e. error free). If server 130 receives user event data 170 intact, server 130 sends acknowledgement 190 to client 100 which indicates to client 100 that server 130 received user event data 170. In one embodiment, client 100 re-sends user event data 170 to server 130 if client 100 does not receive an acknowledgement message within a particular time period.

In another embodiment, server 130 compares user event data history and determines whether to adjust collection threshold settings for user event data collection. For example, server 130 may be receiving a numerous amount of user event data corresponding to user 110 entering a particular region. In this example, server 130 may adjust collection threshold settings in order to decrease the amount of user event data that client 100 sends corresponding to the particular region (see FIGS. 8, 10, and corresponding text for further details regarding collection threshold settings).

FIG. 2 is a user interface window showing regions that include various user functions. Window 200 displays a web page that is divided up into four regions. The four regions are region A 210, region B 220, region C 230, and region D 240. Window 200 includes text box 280 which corresponds to location of the displayed web page. Window 200 also includes scroll bar 285 in which a user selects in order to view various places of the displayed web page. A user may select command buttons 250, 255, 260, 265, 270, and 275 in order to provide browser instructions to a client, such as displaying a previously displayed web page or displaying the user's home page.

The displayed web page and a corresponding collection program are configured such that the collection program tracks user events between the four regions, such as pointing device (i.e. mouse) movements. Region A 210 includes links 212, 214, and 216 in which a user selects to view corresponding web pages. When a user moves his pointing device into region A 210, the collector program tracks how long the pointing device is within region A 210. If the user selects link 212, 214, or 216, and the selection instructs the client to request a new web page, the collector program stops collecting user event data and sends the amount of time the user's pointing device remained in region A 210 prior to the new page request.

Region B 220 includes command button 225 in which a user selects to initiate an applet and display a mortgage calculator. Selecting command button 225 does not instruct the client to request information from the server since the applet is loaded on the client at the time the web page was loaded. When the user moves his pointing device into region B 220, the collector program tracks the user event until the user's pointing device leaves region B 220, at which point the collector program sends user event data to the server. In one embodiment, region B 220 may be sub-divided such that command button 225 is considered its own region, such as region D1.

Region C 230 includes list 232 which includes command buttons for a user to select. When the use positions his mouse over one of the command buttons, the client displays a sub-list, such as sub-list 236. The example in FIG. 2 shows that the user positioned pointing device 232 over command button 234 which instructs processing to display sub-list 236. In one embodiment, region C 230 may be sub-divided into smaller regions such that each command button is considered a separate region, such as region C1, region C2, region C3, and region C4. In this embodiment, the collection program tracks which command button a user is most interested.

Region D 240 includes tabs 242, 244, and 246 which correspond to particular financial news. Information corresponding to each tab is loaded when the web page is displayed. When a user selects one of the tabs, the client brings corresponding data to the forefront for the user to view. When a user moves his pointing device into region D 240, the data collector program tracks the length of time that the pointing device resides in region D 240. In one embodiment, region D 240 may be sub-divided into smaller regions such that tabs 242, 244, and 246 are considered separate regions, such as region D1, region D2, and region D3. In this embodiment, the collection program tracks which tab a user is most interested.

FIG. 3 is a flowchart showing steps taken in a developer dividing a web page into regions. Processing commences at 300, whereupon processing retrieves a page of data from page store 315 (step 310). For example, the page of data may be HTML code corresponding to a web page. Page store 315 may be stored on a non-volatile storage area, such as a computer hard drive. Developer 325 identifies a first region of the page of data at step 320. For example, developer 325 may wish to divide the page of data into four equal segments whereby the first region is the upper left corner of the web page.

Developer 325 selects a starting location of the identified region at step 330, and processing inserts a start tag at the selected starting location (step 340). Developer 325 identifies an ending location of the identified region at step 350, and processing inserts a end tag at the selected ending location (step 360).

A determination is made as to whether there are more regions to process (decision 370). Using the example described above, three other regions require processing. If there are more regions to process, decision 370 branches to "Yes" branch 372 which loops back to identify (step 380) and process the next region. This looping continues until there are no more regions to process, at which point decision 370 branches to "No" branch 378 whereupon processing ends at 390. The page of data is now divided into regions and is ready to send to a client computer.

Figure 4:
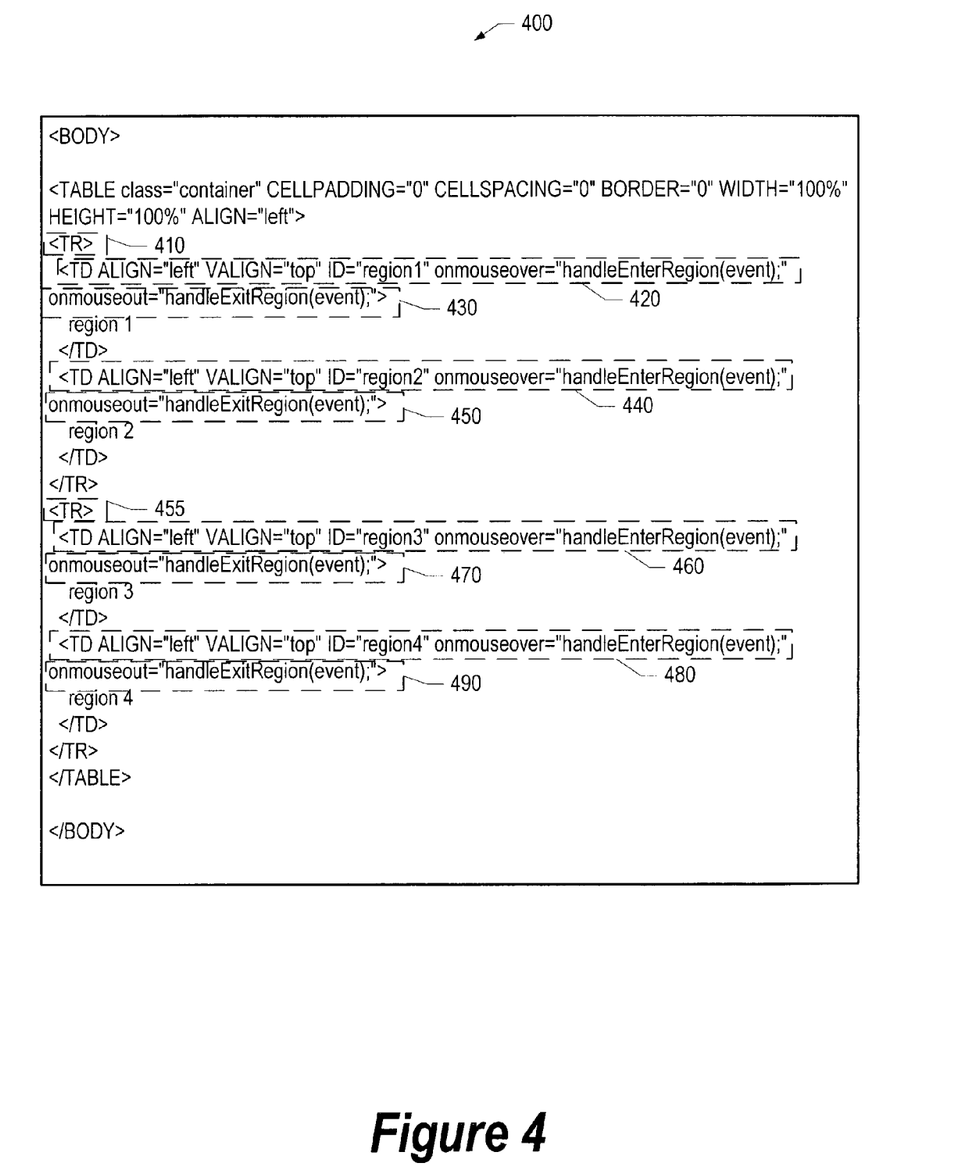
FIG. 4 is a display showing lines of code that identify particular regions within a web page.

FIG. 4 is a display showing lines of code that identify particular regions within a web page. Display 400 includes HTML code that divides a web page into four physical regions by defining a table and including four cells in the table. As one skilled in the art can appreciate, other methods of regionalizing a web page may be used, such as logical groupings whereby each web page link on a particular web page is grouped into one region.

Line 410 includes a tag "<TR>" that defines the beginning of a first row of the table. Line 420 includes code for the first cell of the first row which includes an "onmouseover" event handler. When a user's mouse is positioned over the first cell in the first row (e.g. region 1), onmouseover calls "handleEnterRegion" that is located in a collector program which timestamps when the mouse entered the region. Line 430 includes code which includes an "onmouseout" event handler. When a user's mouse exits region 1, onmouseout calls "handleExitRegion" that is included in the collector program which timestamps when the mouse exits region 1. The collector program may also perform functions, such as identifying an amount of time that the user's mouse was in region 1 (see FIG. 5 and corresponding text for further details regarding collector program properties).

Line 440 includes code for the second cell of the first row which includes an "onmouseover" event handler. When a user's mouse is positioned over the second cell in the first row (e.g. region 2), onmouseover calls "handleEnterRegion" that is included in the collector program which timestamps when the mouse entered region 2. Line 450 includes code which includes an "onmouseout" event handler. When a user's mouse exits region 2, onmouseout calls "handleExitRegion" that is included in the collector program which timestamps when the mouse exits region 2.

Line 455 includes a tag "<TR>" that defines the beginning of a second row of the table. Line 460 includes code for the first cell of the second row which includes an "onmouseover" event handler. When a user's mouse is positioned over the first cell in the second row (e.g. region 3), onmouseover calls "handleEnterRegion" that is included in the collector program which timestamps when the mouse entered region 3. Line 470 includes code which includes an "onmouseout" event handler. When a user's mouse exits region 3, onmouseout calls "handleExitRegion" that is included in the collector program which timestamps when the mouse exits region 3.

Line 480 includes code for the second cell of the second row which includes an "onmouseover" event handler. When a user's mouse is positioned over the second cell in the second row (e.g. region 4), onmouseover calls "handleEnterRegion" that is included in the collector program which timestamps when the mouse entered region 4. Line 490 includes code which includes an "onmouseout" event handler. When a user's mouse exits region 4, onmouseout calls "handleExitRegion" that included in the collector program which timestamps when the mouse exits region 4.

Figure 5:
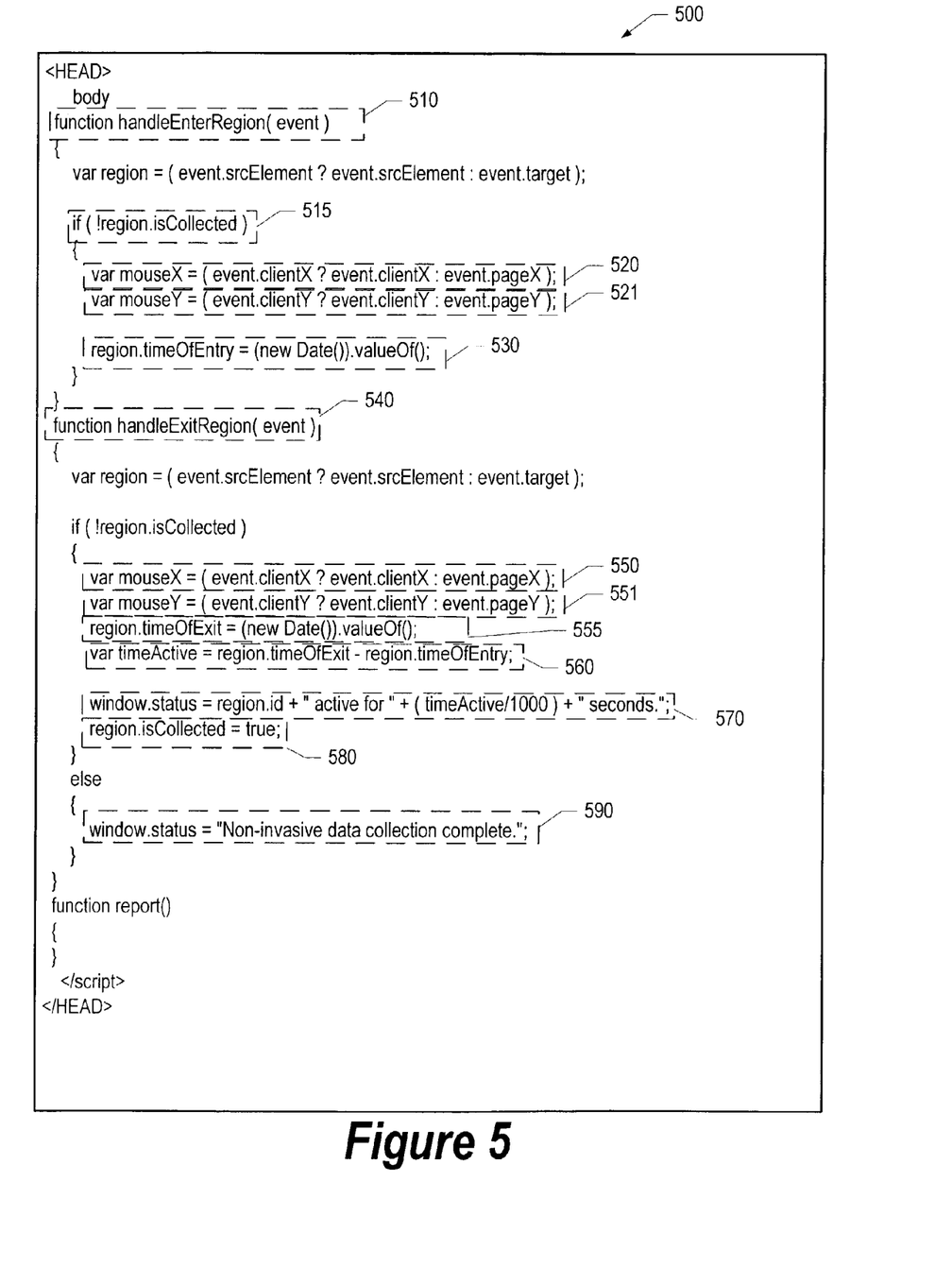
FIG. 5 is a display showing lines of code for a collector program that tracks an amount of time that a pointing device is within a particular region.

FIG. 5 is a display showing lines of code for a collector program that tracks an amount of time that a pointing device is within a particular region. Display 500 includes functions that create event objects which timestamp when a mouse enters a particular region (e.g. handleEnterRegion) and when a mouse exits the particular region (e.g. handleExitRegion).

Line 510 includes code that creates an event object "handleEnterRegion" which includes lines 515 through 530. When a mouse enters a particular region, an onmouseover event calls handleEnterRegion to timestamp when the mouse entered the region (see FIG. 4 and corresponding text for further details regarding onmouseover events). Line 515 includes code that determines whether user event data has been collected for the particular region that is calling handleEnterRegion. For example, a user may have positioned his mouse in "region 1" whereby the collector program marked the region (see line 580 description below). In this example, the collector program does not acquire user event data for region 1 since data has been previously acquired.

Lines 520 and 521 include code that mark X and Y coordinates as to the location of a user's pointing device. The coordinate information is not used in the example shown in FIG. 5, but may be used in another embodiment whereby a developer wishes to know the location of the mouse pointer in greater detail than just the region that the pointer entered. Line 530 includes code that marks the time of entry that the user's pointing device entered the particular region.

Line 540 includes code that creates an event object "handleExitRegion" which includes lines 550 through 580. When a mouse exits a particular region, an onmouseout event calls handleExitRegion to timestamp when the mouse exits the region (see FIG. 4 and corresponding text for further details regarding onmouseout events). Lines 550 and 551 include code that mark X and Y coordinates as to the location of a user's pointing device. The coordinate information is not used in the example shown in FIG. 5, but may be used in another embodiment whereby a developer wishes to know the location of the mouse pointer in greater detail than just the region that the mouse pointer is located. Line 555 includes code that marks the time of exit that the user's mouse exits the particular region.

Line 560 includes code that calculates the time that a user's pointing device was in a region by subtracting the time of entry from the time of exit. Line 570 includes code that displays a message on a status bar that includes the region that the user's mouse exited and the time that the mouse was in the region. Line 580 includes code that marks a location collection flag "true". The location collection flag is used to identify that data has been collected for the particular region. The example in FIG. 5 shows that when a user re-enters a region and the region's location collection flag is "true", line 515 jumps to line 590 which displays a message on the status bar "Non-invasive data collection complete".

Figure 6:
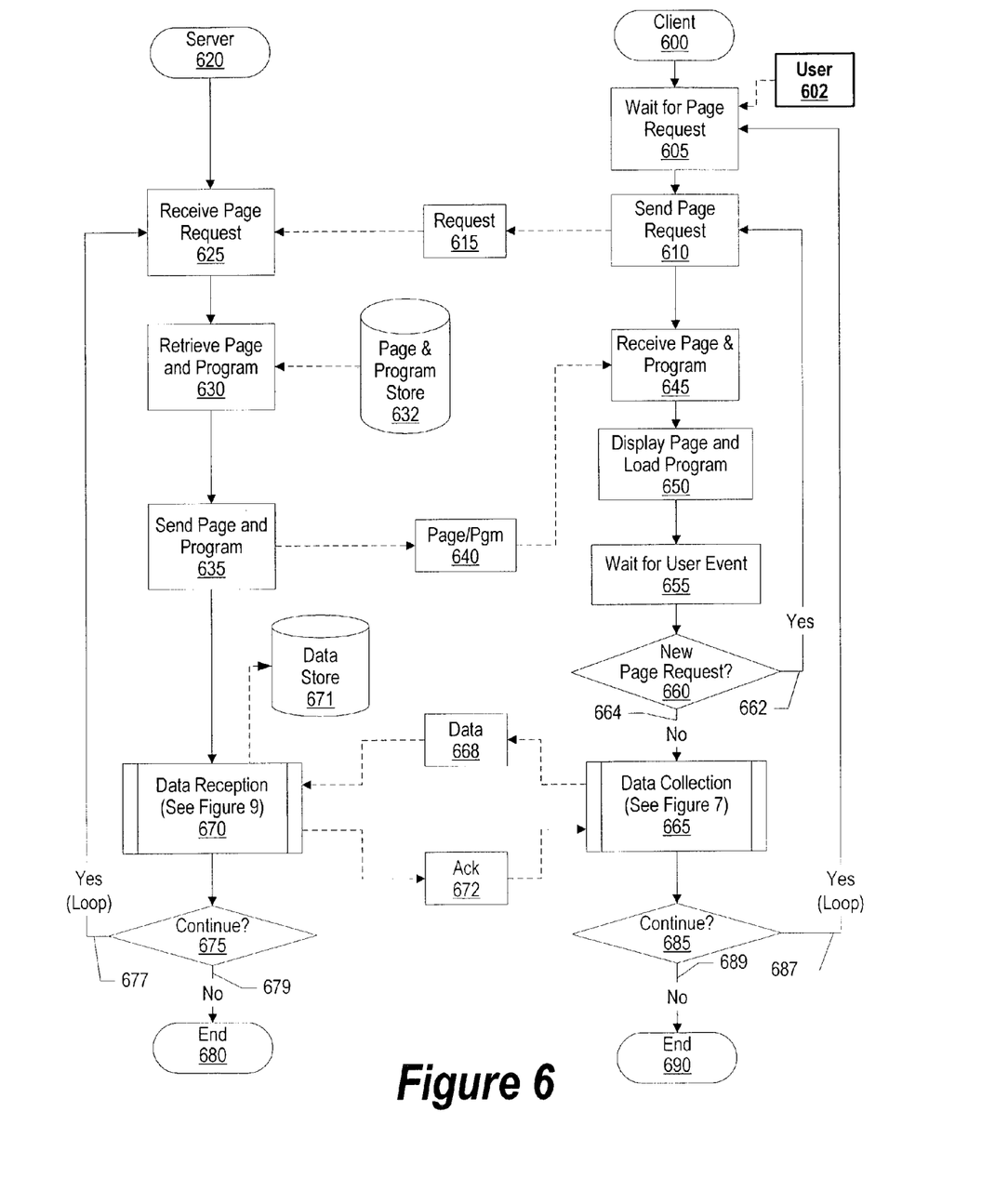
FIG. 6 is a flowchart showing steps taken in a server sending a web page to a client, the client collecting data corresponding to a user event, and the client sending the user event data to the server.

FIG. 6 is a flowchart showing steps taken in a server sending a web page to a client, the client collecting data corresponding to a user event, and the client sending the user event data to the server. Client processing commences at 600, whereupon the client waits for a page request from user 602 (step 605). For example, user 602 may enter a URL location to view a particular web page. When the client receives the page request from user 602, the client sends page request 615 to a server at step 610.

Server processing commences at 620, whereupon the server receives page request 615 at step 625. The server retrieves the requested page and a corresponding data collector program from page and program store 632 at step 630. In one embodiment, the page and program are included in one file. Page and program store 632 may be stored on a non-volatile storage area, such as a computer hard drive. The server sends page/program 640 to the client at step 635.

The client receives page/program 640 at step 645. The client displays the request page on the client's display and loads the collector program (step 650). The client waits for a user event at step 655, such as user 602 moving his pointing device. When the client detects a user event, a determination is made as to whether the user event is requesting a new web page. For example, the user may select a hyperlink on the displayed web page that points to a second web page. If the user event is a new page request, decision 660 branches to "Yes" branch 662 which loops back to send and process a new page request. This looping continues until the client detects a user event that is not a new page request, at which point decision 660 branches to "No" branch 664 whereupon the client collects user event data corresponding to the user event, and sends the user event data (e.g. data 668) to the server (pre-defined process block 665 see FIG. 7 and corresponding text for further details regarding data collection).

The server receives data 668, stores the data in data store 671, and sends an acknowledgement message (e.g. acknowledgement 672) to the client indicating that the server received data 668. Data store 671 may be stored on a non-volatile storage area, such as a computer hard drive. A determination is made as to whether the server should continue processing (decision 675). If the server should continue processing, decision 675 branches to "Yes" branch 677 which loops back to receive more page requests. This looping continues until the server stops processing, at which point decision 675 branches to "No" branch 679 whereupon server processing ends at 680.

The client receives acknowledgement 672 which informs the client that the server received the user event data. If the client did not receive acknowledgement 672 within a particular timeframe, the client may re-send data 668 to the server until the client receives an acknowledgement message from the server. A determination is made as to whether the client should continue processing (decision 685). If the client should continue processing, decision 685 branches to "Yes" branch 687 which loops back to process more user requests. This looping continues until client processing should stop, at which point decision 685 branches to "No" branch 689 whereupon client processing ends at 690.

Figure 7:
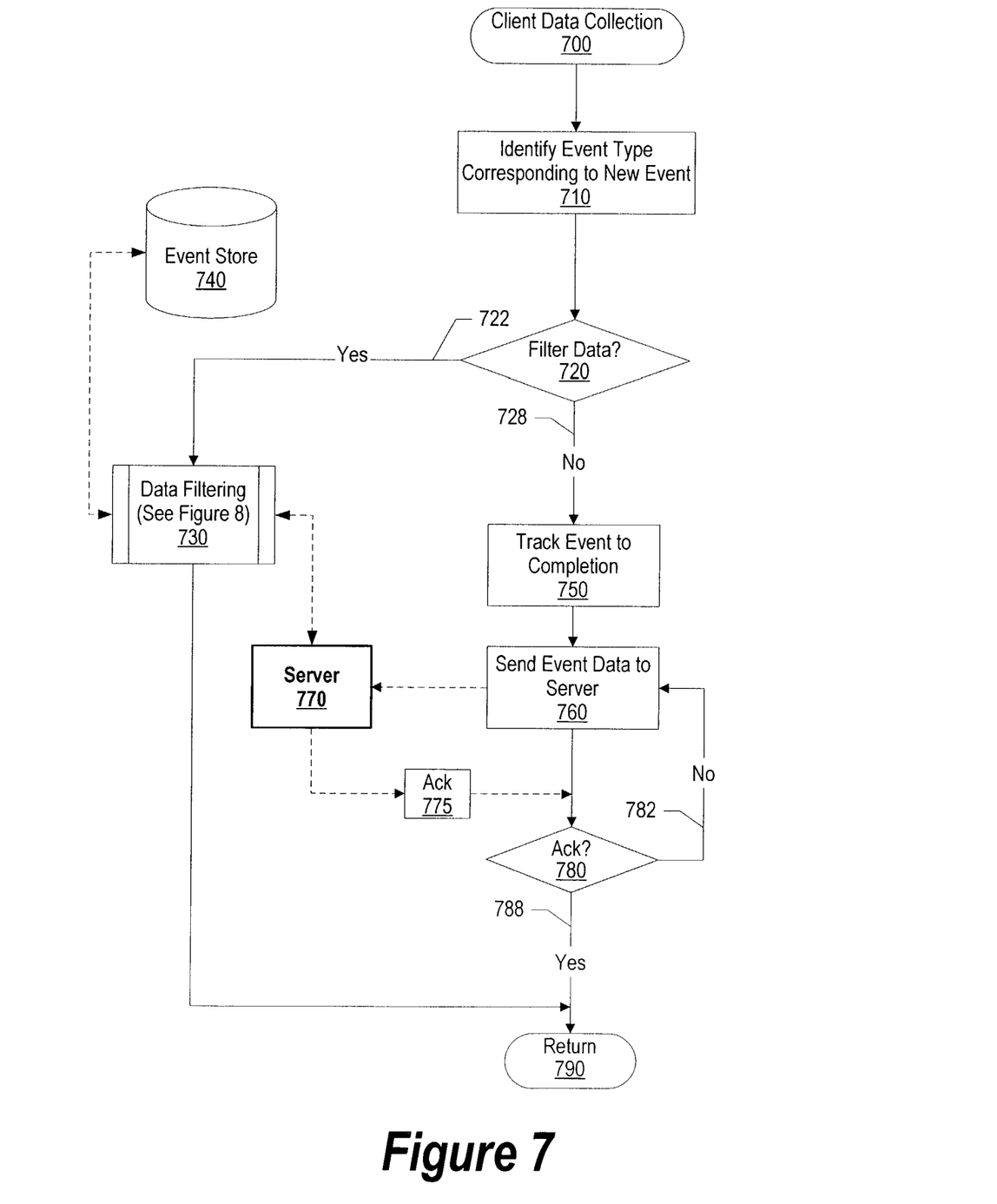
FIG. 7 is a flowchart showing steps taken in a client non-invasively collecting user event data.

FIG. 7 is a flowchart showing steps taken in a client non-invasively collecting user event data. Processing commences at 700, whereupon the client identifies an event type corresponding to a newly detected event (step 710). For example, a user may have moved his mouse into a region, such as "Region 1", whereby processing identifies the event type as "Region 1 mouseover".

A determination is made as to whether processing should filter the user event data (decision 720). Using the example described above, processing may be configured such that the client should send region 1 user event data to the server once per session. In this example, processing sends region 1 user event data the first time a user's pointing device enters region 1, and then filters out (i.e. doesn't send) subsequent region 1 user event data.

Figure 8:
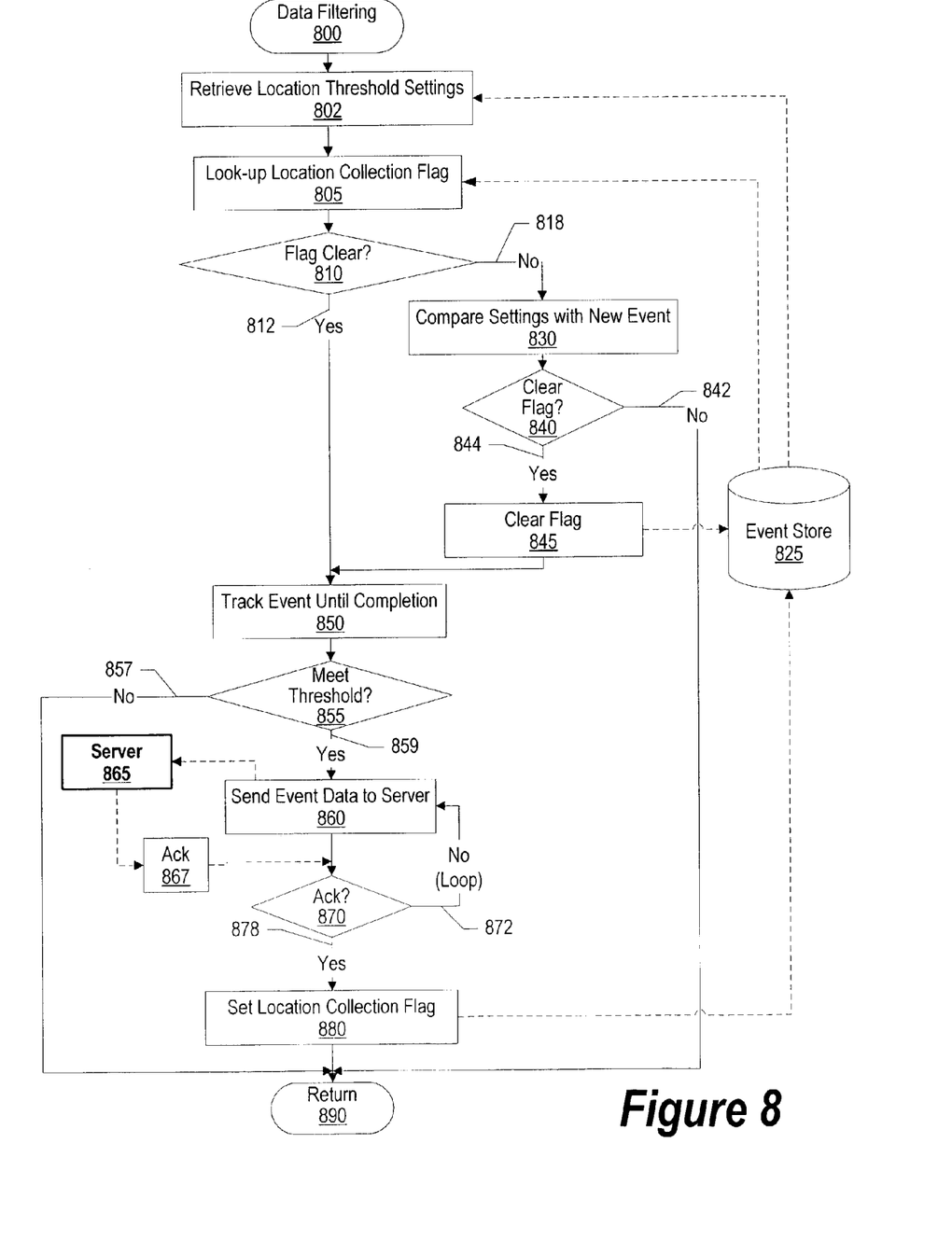
FIG. 8 is a flowchart showing steps taken in a client filtering user event data.

If processing should filter the user event data, decision 720 branches to "Yes" branch 722 whereupon the user event data is filtered using collection threshold settings that are retrieved from event store 740 (pre-defined process block 730, see FIG. 8 and corresponding text for further details). Event store 740 may be stored on a non-volatile storage area, such as a computer hard drive.

On the other hand, if processing should not filter the user event data and should send data to the server corresponding to each user event, processing branches to "No" branch 728 whereupon processing tracks the user event until completion (step 750). For example, processing may track the amount of time that a user places his mouse in a particular region. Once the user event is completed (i.e. the mouse is moved out of a region), processing sends the user event data to server 770 (step 760). If server 770 receives the data intact, server 770 sends acknowledgement 775 to the client. On the other hand, if server 770 did not receive the data intact, server 770 may not send a response, or server 770 may send an error message to the client that indicates that the user event data included errors.

A determination is made as to whether the client received an acknowledgment message from server 770 (decision 780). If the client did not receive an acknowledgement message, decision 780 branches to "No" branch 782 which loops back to re-send the user event data. This looping continues until the client receives an acknowledgement message, at which point decision 780 branches to "Yes" branch 788 whereupon processing returns. In one embodiment, processing may be configured to limit the number of attempts to send the user event data to the server, such as five attempts. In this embodiment, the client sends the user event data to the server a maximum of five times.

FIG. 8 is a flowchart showing steps taken in a client filtering user event data. For example, processing may be configured such that the client should capture user event data corresponding to a particular event one time per session and then filter out (i.e. do not capture) subsequent user event data for the particular event during the remaining session.

Processing commences at 800, whereupon processing retrieves collection threshold settings corresponding to the user event from event store 825 (step 802). Collection threshold settings include settings that are configured to filter user event data. For example, a vendor may wish to set an out-of-region threshold, such as ten seconds, for a region on his web page such that once user event data is collected for the region, user events are not tracked for another ten seconds. Event store 825 may be stored on a non-volatile storage area, such as a computer hard drive.

Processing looks-up a location collection flag in event store 825 (step 805). The location collection flag corresponds to a particular user event and identifies whether the event has occurred. For example, if the user event is a "mouse in region 1" event, processing retrieves the location collection flag that corresponds to a "mouse in region 1" event. A determination is made as to whether the location collection flag is cleared (decision 810). If the location collection flag is clear, decision 810 branches to "Yes" branch 812 whereupon processing tracks the user event at step 850.

On the other hand, if the flag is set, decision 810 branches to "No" branch 818 whereupon processing performs steps to identify whether to collect user event data based upon the last occurrence of the user event and the collection threshold settings. Processing compares the collection threshold settings with the user event's properties at step 830. Using the example described above, processing identifies the time that the new region 1 mouseover event occurs, identifies when location collection flag was last set, and compares the difference in time with the collection threshold settings.

A determination is made as to whether to clear the collection threshold settings based on the comparison performed in step 830 (decision 840). If processing should clear the location collection flag, decision 840 branches to "Yes" branch 844 whereupon processing clears the location collection flag (step 845) and tracks the user event at step 850. Using the example described above, the location collection flag may have been set twenty seconds prior to the current user event. In this example, processing clears the location collection flag since the time between the two user events is longer than the corresponding collection threshold settings. On the other hand, if processing should not clear the location collection flag, decision 840 branches to "No" branch 842 bypassing location collection flag clearing steps.

Processing tracks the user event until completion at step 850. Using the example described above, processing tracks the "mouse in region 1" event until the user moves his pointing device out of region 1. A determination is made as to whether the user event meets collection threshold settings (decision 855). For example, an "in-region" collection threshold setting may be configured to require a user's pointing device to be in a particular region for a minimum amount of time in order to consider the user event valid, such as ten seconds. If the user event data does not meet collection threshold settings, decision 855 branches to "No" branch 857 bypassing user event data sending steps.

On the other hand, if the user event data meets collection threshold settings, decision 855 branches to "Yes" branch 859 whereupon processing sends the user event data to server 865 (step 860). If server 865 receives the user event data intact, server 865 sends acknowledgement 867 to the client. On the other hand, if server 865 did not receive the user event data intact, server 865 may not send a response, or server 865 may send an error message to the client that indicates that the user event data included errors.

A determination is made as to whether the client received an acknowledgment message from server 865 (decision 870). If the client did not receive an acknowledgement message, decision 870 branches to "No" branch 872 which loops back to resend the user event data. This looping continues until the client receives an acknowledgement message, at which point decision 870 branches to "Yes" branch 878 whereupon processing sets the location collection flag at step 880, and processing returns at 890.

In one embodiment, processing may be configured to limit the number of attempts to send the user event data to the server, such as five attempts. In this embodiment, the client sends the user event data to the server a maximum of five times.

Figure 9:
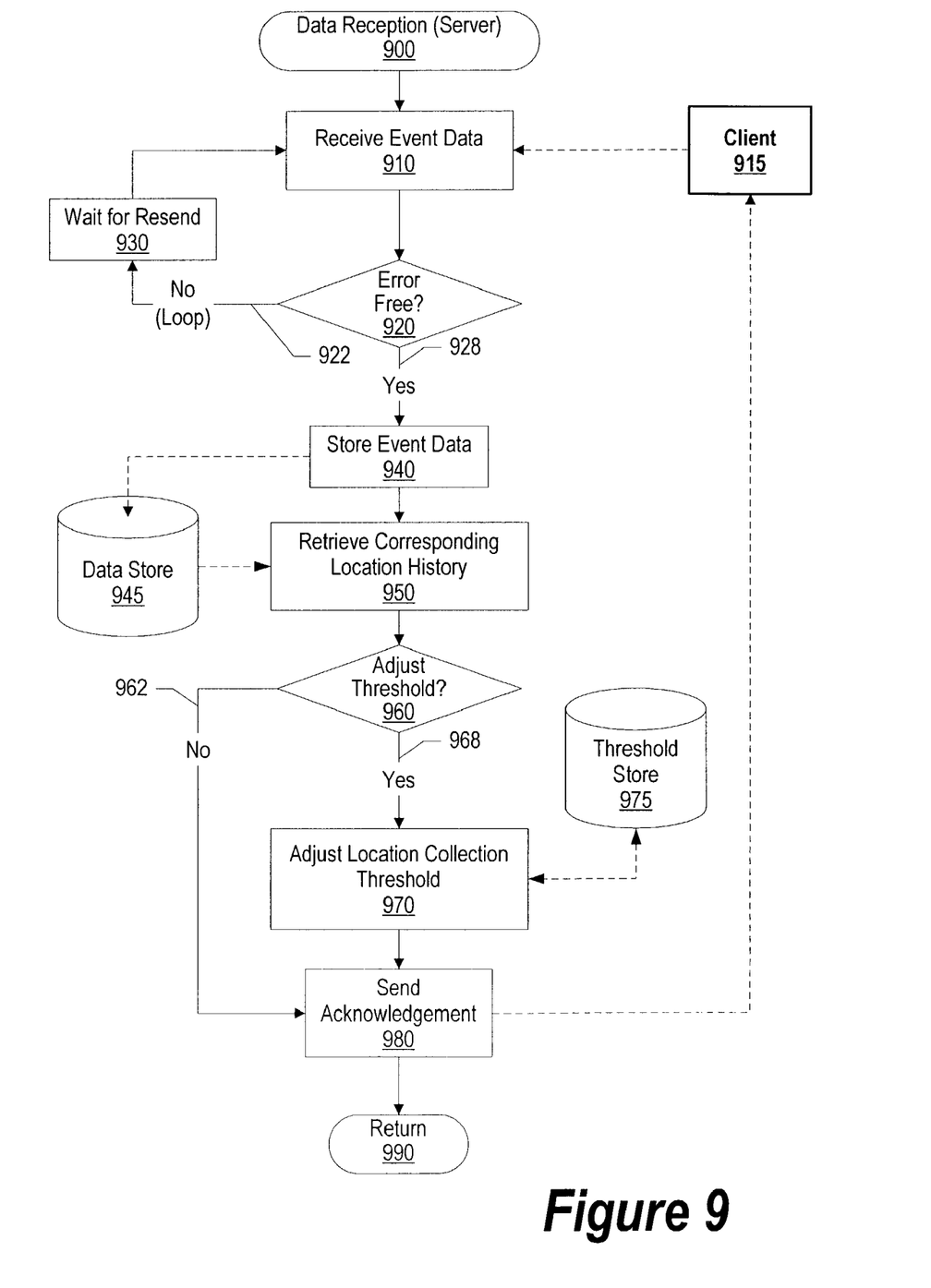
FIG. 9 is a flowchart showing steps taken in processing user event data at a server location.

FIG. 9 is a flowchart showing steps taken in processing user event data at a server location. Server processing commence at 900, whereupon the server receives user event data from client 915 at step 910. A determination is made as to whether processing received the user event data intact (decision 920). For example, processing may perform a checksum comparison to see if the user event data includes errors. If the server did not receive the user event data intact, decision 920 branches to "No" branch 922 which loops back to wait for client 915 to resend the user event data (step 930). In one embodiment, processing sends an error message to the client that indicates that the user event data included errors. This looping continues until the server receives the user event data intact, at which point decision 920 branches to "Yes" branch 928.

Processing stores the user event data in data store 945. Data store 945 includes user event data history and may be stored on a non-volatile storage area, such as a computer hard drive. Processing retrieves user event data history from data store 945 that corresponds to the stored user event at step 950. A determination is made as to whether processing should adjust collection threshold settings based upon the user event data history (decision 960). For example, the user event data history may indicate that a numerous amount of data may be stored for a particular region and that the region's "out-of-region" threshold setting should be increased in order to decrease the amount of user event data that the client sends.

If collection threshold settings should not be adjusted, decision 960 branches to "No" branch 962 bypassing collection threshold adjustment steps. On the other hand, if the collection threshold settings should be adjusted, decision 960 branches to "Yes" branch 968 whereupon processing adjusts the collection threshold settings located in threshold store 975 and includes the adjusted collection threshold settings in a client acknowledgement message (see below). Collection threshold store 975 may be stored on a non-volatile storage area, such as a computer hard drive.

Processing sends an acknowledgement message to client 915 at step 980 which indicates that the server received the user event data and may include adjusted collection threshold settings. Processing returns at 990.

Figure 10:
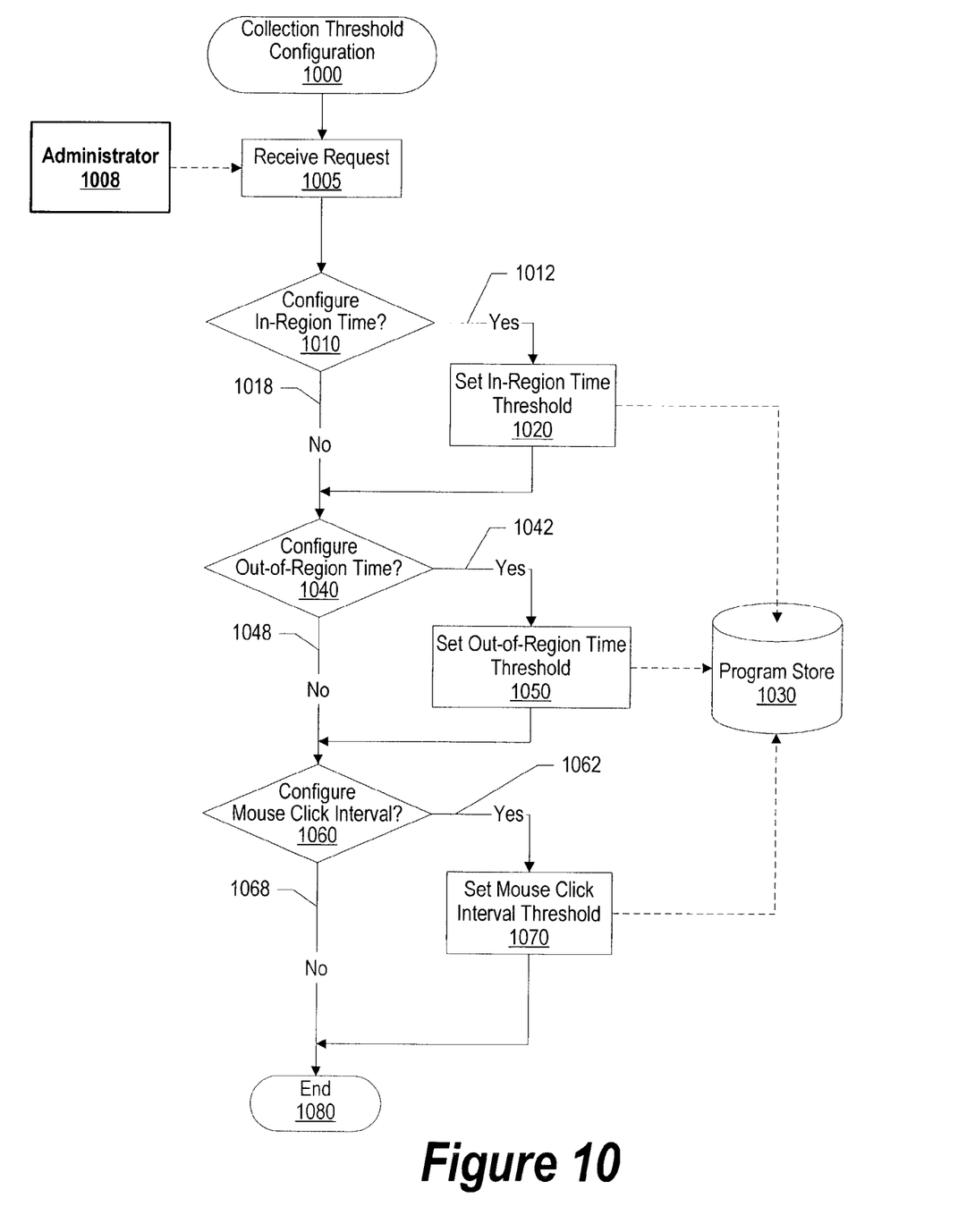
FIG. 10 is a flowchart showing steps taken in a server configuring collection threshold settings.

FIG. 10 is a flowchart showing steps taken in a server configuring collection threshold settings. Collection threshold settings are used to filter user event data for a particular user event. For example, a server may wish to receive user event data for a particular user event one time per session instead of each time the particular user event occurs.

Processing commences at 1000, whereupon processing receives a collection threshold setting request from administrator 1008 (step 1005). A determination is made as to whether administrator 1008 wishes to configure an "in-region time" (decision 1010). The in-region time identifies how long a particular user event should occur in order to consider the user event valid. For example, the administrator may require a user's pointing device to stay in a region for a minimum of eight seconds in order to consider the user event valid.

If administrator 1008 wishes to configure an in-region time, decision 1010 branches to "Yes" branch 1012 whereupon processing stores administrator 1008's in-region threshold settings in program store 1030 (step 1020). Program store 1030 may be stored on a non-volatile storage area, such as a computer hard drive.

On the other hand, if administrator 1008 does not wish to configure in-region settings, decision 1010 branches to "No" branch 1018 bypassing in-region threshold setting steps. A determination is made as to whether administrator 1008 wishes to configure an "out-of-region" time (decision 1040). For example, the administrator may require that once a user's pointing device leaves a particular region from a first user event, that the user's pointing device should stay out of the region for five seconds before re-entering the region in order to consider the entry as a second user event.

If administrator 1008 wishes to configure out-of-region threshold settings, decision 1040 branches to "Yes" branch 1042 whereupon processing stores the administrator's out-of-region settings in program store 1030. On the other hand, if administrator 1008 does not wish to configure out-of-region settings, decision 1040 branches to "No" branch 1048 bypassing out-of-region setting steps.

A determination is made as to whether administrator 1008 wishes to configure a mouse click interval (decision 1060). For example, the administrator's web page may include applets, such as a mortgage calculator, whereby a user selects the mortgage calculator using a mouse click. In this example, the administrator may wish to receive user event data for the user event one time per session instead of each time the user selects the mortgage calculator. If administrator 1008 wishes to configure the mouse click interval, decision 1060 branches to "Yes" branch 1062 whereupon processing stores the administrator's mouse click interval threshold in program store 1030 (step 1070). On the other hand, if administrator 1008 does not wish to configure the mouse click interval, decision 1060 branches to "No" branch 1068 bypassing mouse interval storing steps. Processing ends at 1080.

As one skilled in the art can appreciate, an administrator my configure collection threshold settings at a regional level or the administrator may configure collection threshold settings on a global level, such as for an entire web page.

Figure 11:
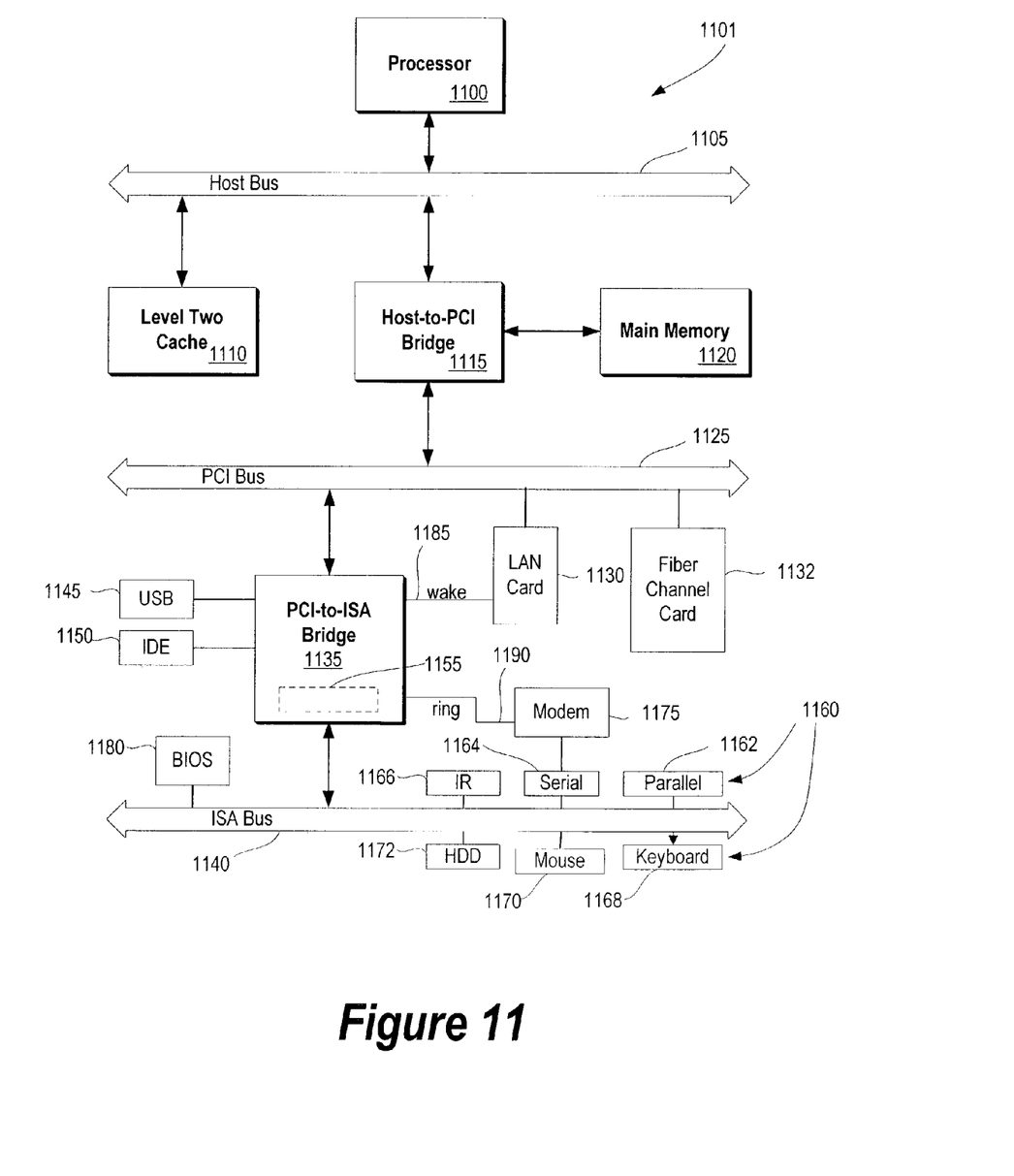
FIG. 11 is a block diagram of an method capable of implementing the present invention.

FIG. 11 illustrates information handling system 1101 which is a simplified example of a computer system capable of performing the invention described herein. Computer system 1101 includes processor 1100 which is coupled to host bus 1105. A level two (L2) cache memory 1110 is also coupled to the host bus 1105. Host-to-PCI bridge 1115 is coupled to main memory 1120, includes cache memory and main memory control functions, and provides bus control to handle transfers among PCI bus 1125, processor 1100, L2 cache 1110, main memory 1120, and host bus 1105. PCI bus 1125 provides an interface for a variety of devices including, for example, LAN card 1130. PCI-to-ISA bridge 1135 provides bus control to handle transfers between PCI bus 1125 and ISA bus 1140, universal serial bus (USB) functionality 1145, IDE device functionality 1150, power management functionality 1155, and can include other functional elements not shown, such as a real-time clock (RTC), DMA control, interrupt support, and system management bus support. Peripheral devices and input/output (I/O) devices can be attached to various interfaces 1160 (e.g., parallel interface 1162, serial interface 1164, infrared (IR) interface 1166, keyboard interface 1168, mouse interface 1170, and fixed disk (HDD) 1172) coupled to ISA bus 1140. Alternatively, many I/O devices can be accommodated by a super I/O controller (not shown) attached to ISA bus 1140.

BIOS 1180 is coupled to ISA bus 1140, and incorporates the necessary processor executable code for a variety of low-level system functions and system boot functions. BIOS 1180 can be stored in any computer readable medium, including magnetic storage media, optical storage media, flash memory, random access memory, read only memory, and communications media conveying signals encoding the instructions (e.g., signals from a network). In order to attach computer system 1101 to another computer system to copy files over a network, LAN card 1130 is coupled to PCI bus 1125 and to PCI-to-ISA bridge 1135. Similarly, to connect computer system 1101 to an ISP to connect to the Internet using a telephone line connection, modem 1175 is connected to serial port 1164 and PCI-to-ISA Bridge 1135.

While the computer system described in FIG. 11 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of filtering user event data occurring on a computer system, said method comprising:
   sending a page of data to the computer system, the page of data divided into a plurality of regions;
   transmitting a data collection program to the computer system, the data collection program adapted to identify user events performed by a user of the computer system, during a first session, and also adapted to identify a region, selected from the plurality of regions, in which the user events were performed;
   identifying a first user event performed by the user of the computer system during the first session, wherein the first user event is performed in a first region;
   detecting that the first user event has ended at a first time;
   identifying a second user event performed by the user of the computer system during the first session, wherein the second user event is performed in the first region, and wherein the second user event occurs at a second time, the second time being after the first time;
   determining the difference between the first time and the second time, wherein the difference is an elapsed time between the first user event ending and the second user event being identified;
   comparing the elapsed time to an out of region threshold setting, wherein the out of region threshold setting indicates an amount of time;
   in response to the comparing, determining whether the elapsed time is greater than or equal to the out of region threshold setting;
   in response to determining that the elapsed time is greater than or equal to the out of region threshold setting, tracking the second user event to completion and sending second user event data corresponding to the second user event to a tracking system;
   retrieving user event data history corresponding to the first region;
   in response to retrieving the user event data history, deciding to adjust the out of region threshold setting corresponding to the first region; and
   in response to the deciding, adjusting the out of region threshold setting corresponding to the first region, wherein the adjusting comprises increasing the amount of time.

2. The method as described in claim 1 further comprising:
   receiving, from the computer system, the second user event data corresponding to the second user event;
   verifying whether the received second user event data is intact; and
   sending an acknowledgement message to the computer system in response to the verification.

3. A method of filtering user event data occurring on a computer system, said method comprising:
   sending a page of data to the computer system, the page of data divided into a plurality of regions;
   transmitting a data collection program to the computer system, the data collection program adapted to filter user event data corresponding to user events performed by a user of the computer system and also adapted to identify a region, selected from the plurality of regions, in which the user events were performed;
   identifying a first user event performed by the user of the computer system, wherein the first user event is performed in a first region;
   retrieving one or more threshold settings corresponding to the first user event;
   retrieving a first location collection flag corresponding to the first user event;
   determining whether the first location collection flag is clear;
   in response to determining that the first location collection flag is not clear, performing the following:
      comparing the first user event with the retrieved threshold settings; and
      deciding whether to clear the location collection flag based on the comparison;
   in response to determining that the first location collection flag is clear, performing the following:
      tracking the first user event to completion;
      comparing the completed first user event to the retrieved threshold settings;
      in response to determining that the completed first user event meets the retrieved threshold settings:
         sending user event data corresponding to the first user event to a tracking system; and
         setting the first location collection flag; and
      in response to determining that the completed first user event does not meet the retrieved threshold settings, ignoring the first user event;
   retrieving user event data history corresponding to the first region;
   in response to retrieving the user event data history, deciding to adjust a first threshold setting, wherein the first threshold setting corresponds to the first region, and wherein the first threshold setting is selected from the retrieved threshold settings; and
   in response to the deciding, adjusting the first threshold setting.

4. The method as described in claim 1, further comprising:
   in response to determining that the elapsed time is less than the out of region threshold setting, ignoring the second user event.

* * * * *